Patented May 26, 1953

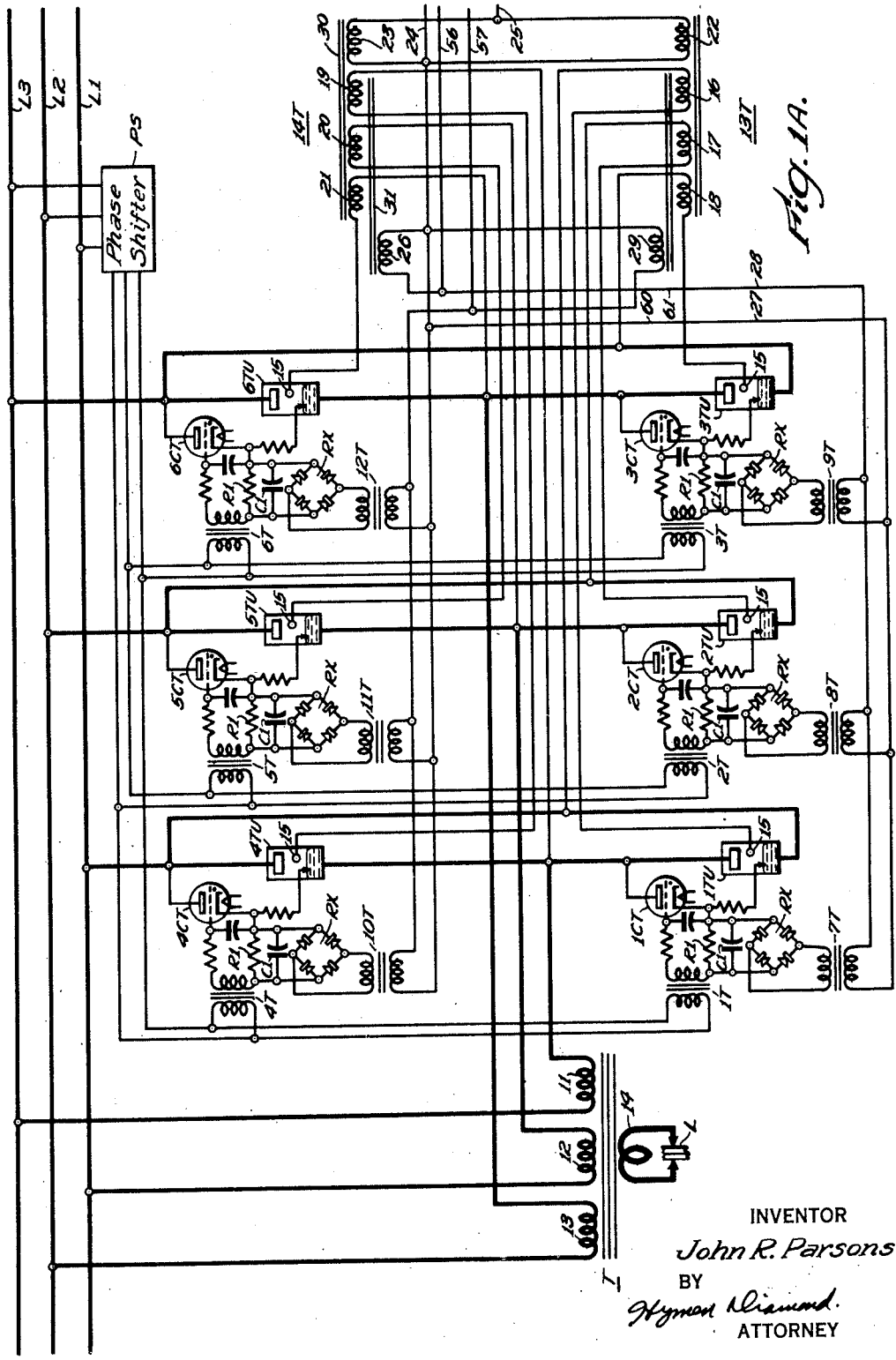

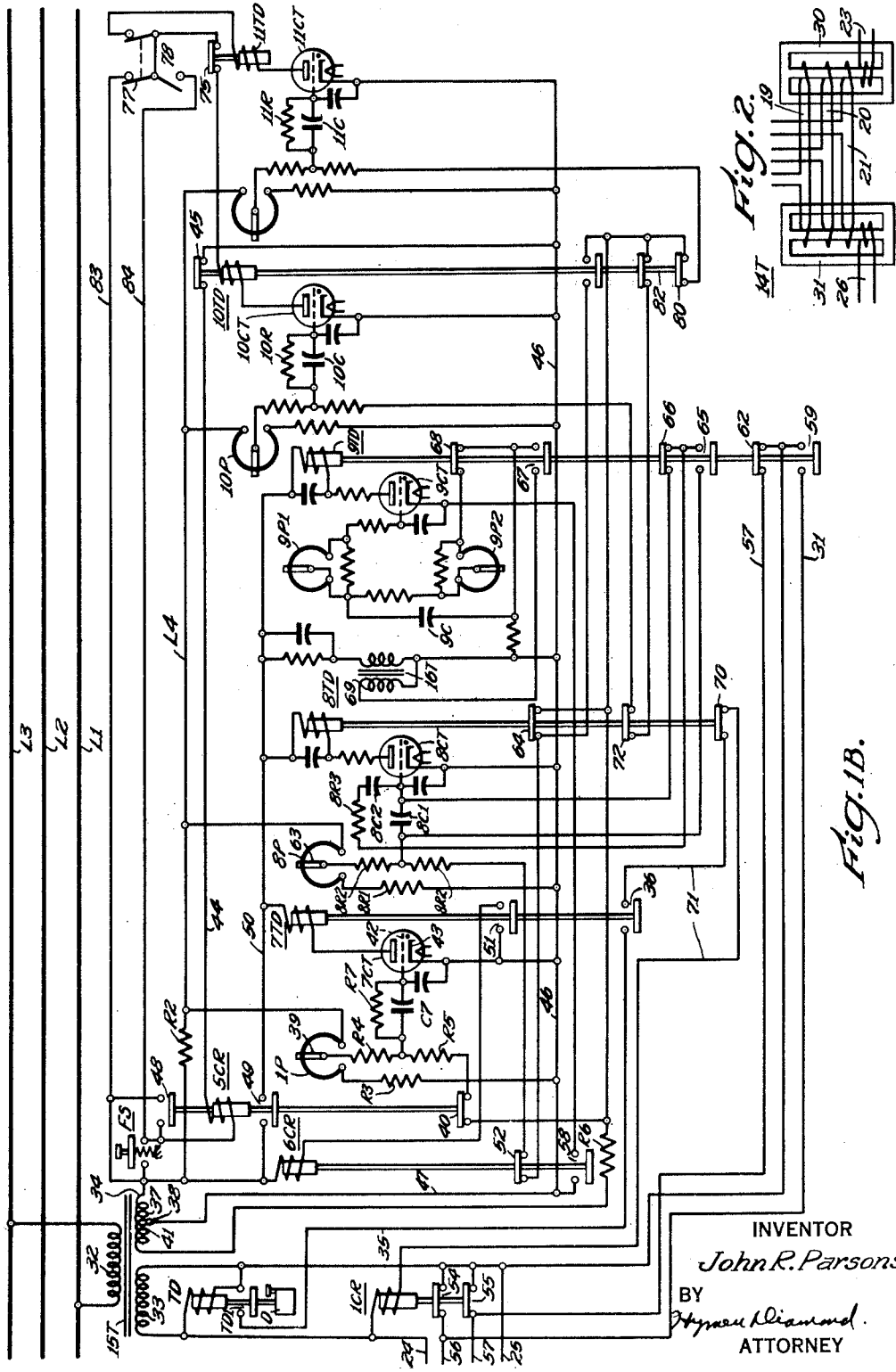

2,640,180

UNITED STATES PATENT OFFICE 2,640,180

WELDING APPARATUS

John R. Parsons, Kenmore, N. Y., assignor to Westinghouse Electric Corporation, East Pittsburgh, Pa., a corporation of Pennsylvania Application April 2, 1948, Serial No. 18,699

9 Claims. (Cl. 321—7)

This invention relates to electric discharge apparatus and has particular relation to electronic timing systems for controlling the supply of power from a source to a load.

Resistance welders have, in the prior art, generally operated from commercial alternating current power lines, and have derived power from a single phase of such lines, despite the fact that most power lines for industrial electricity are of the three phase variety. Such operation has generally been considered satisfactory, for relatively lower power welding.

As the thickness of material to be welded increases, the power drawn from the line increases exponentially. Additionally, and especially in welding steel, a reactive component is introduced into the welding load by the reactance of the secondary winding of the welding transformer, which links with the steel being welded. The reactance of the secondary becomes higher, generally, than the resistance of the secondary, including the weld, so that power factors of as low as 25% are common. Still a further factor to be considered in welding heavy material, requiring extremely high welding current, is skin effect in the secondary circuit, due to the flow of alternating current in the secondary circuit. One does not ordinarily consider skin effect to be significant at sixty cycles per second but under the conditions of extremely high current and extremely low direct current resistance encountered in welding transformer secondaries, secondary resistance is determined in considerable part by skin effect, and the resistance of the secondary circuit cannot, accordingly, be lowered indefinitely by ordinary engineering expedients. Since the current required for welding is fixed, the kilowatt demand of the welding machine is proportional to the resistance of the secondary circuit of the welding transformer, resulting in high kilowatt demand.

Single phase welding has, accordingly, the following limitations:

1. it causes unbalance of the three phase system from which power is drawn;
2. it creates a high kilo-volt ampere demand at low power factor;
3. it creates a high kilowatt demand.

It is extremely desirable to decrease the kilowatt load, thereby decreasing the cost of operation of the welder as well as the total cost of an installation designed to perform given welding functions. It is further extremely desirable that the welder operate at high power factor and constitute a balanced three phase load for similar economic reasons.

When direct current is applied to the primary winding of a single phase transformer, there is created in the iron core of the transformer a magnetic field of increasing value, until the iron saturates. The variation of magnetic field induces a voltage in the secondary of the transformer, and consequently a current, if the secondary circuit is closed. When the secondary current reaches its maximum value the ratio of primary to secondary current is determined by the turns ratio of the transformer, and when the primary is interrupted the secondary current decays. A succeeding current impulse may be in the opposite direction, so that two time-adjacent impulses constitute a low frequency cycle of current. This reduces skin effect, since the effective welding frequency is reduced, which in turn lowers the conductivity of the welding transformer secondary, and thereby the kilowatt demand. Further, secondary reactance is decreased, which raises the power factor of the system.

It is further found, as an ancillary advantage, that the slow rise of welding current causes the current to distribute itself in the weld more evenly, resulting in better welds and no intense local heating or splitting.

The system of direct current welding, above briefly described, lends itself to operation from a three phase line, deriving current from all the phases of the line, since voltage waves in the various lines overlap, and accordingly half-wave rectification of three phase currents and superposition thereof in a single welding secondary provides impulses of direct current of an overlapping and hence substantially continuous character, each phase of the line providing current for 120 degrees of each cycle.

The provision for reversal of the direct current welding current, and control of the amplitude of that current, may comprise arc discharge devices, and specifically ignitrons, connected in inverse parallel, in the separate phases of the three phase line, each controlled by a firing tube to which is applied firing signal in predetermined phase, which may be adjustable.

Timing arrangements may be provided for controlling the operation of the system, enabling sequencing of the complete welding operation, and controlling the on-off times of the arc discharge devices during welding to provide low frequency operation in selected and adjustable periods of current flow, that is, in alternately opposite directions for predetermined time intervals in each direction.

It follows that the development of three phase to single phase welding equipments, wherein the single phase welding current is of low frequency, will lead to increased utility of welding equipment, enabling superior welding, and particularly more economical operation and construction of welding equipment operating at high power.

It is, accordingly, an object of the present invention to provide a novel system of electric welding.

It is a further object of the invention to provide a novel system of D. C. welding.

It is still a further object of the invention to provide a novel system of welding which utilizes the three phases of a three phase power line as a source of welding current.

It is another object of the present invention to provide a system of direct current welding which establishes a load on all the phases of a three phase line.

It is a more specific object of the invention to provide a system of direct current welding wherein sequential and contiguous pulsations of direct current are employed for welding, the pulsations being derived from phases of a three phase line, and flowing successively in opposite directions for substantially equal time intervals.

It is, more broadly, an object of the invention to provide a novel system for controllably transferring power from a three phase power supply to a single phase load.

It is another broad object of the present invention to provide a novel system for controllably transferring power from a three phase power supply to a single phase load, by causing successive increments of current flow in opposite directions in the load, each increment of current enduring for a controllable time interval, and deriving from a plurality of phases of the three phase power supply.

It is still another object of the present invention to provide a system for supplying power to a load from an alternating current source in discrete unidirectional pulses of preselectable duration and alternately opposite directions of flow.

It is a further object of the invention to provide a system of supplying alternating current to a load from an alternating current source, in pulses having a lower frequency than the frequency of the source, the frequency of the current supplied to the load being adjustable.

It is, still further, an object of the present invention to provide a novel system of controlling arc discharge devices connected in a three phase line.

Another object of the invention resides in the provision of a three phase system utilizing inverse parallel connected arc discharge devices to control the flow of current to a load circuit, and having novel timing circuits for establishing the durations of current flow alternately in different predetermined groups of the arc discharge devices.

It is an ancillary object of the invention to provide an electrical interlock system for interconnected arc discharge devices, for preventing discharge of one of the discharge devices in response to discharge of another, whereby to prevent simultaneous firing of associated discharge devices.

It is a further ancillary object of the invention to provide a novel electronic timing circuit for two groups of arc discharge devices, for establishing alternate operation of the groups each for a preselected time and for further establishing the total time of operation of both groups together.

It is still a further ancillary object of the present invention to provide a single electronic timing circuit for establishing the duration of a total time of operation of controlled devices, and for sub-dividing the total time into discrete sub-intervals of time.

Briefly described, in accordance with the present invention, power is applied to a single phase welding load, over a three phase to single phase transformer, from a three phase line, a pair of back to back discharge valves, specifically ignitrons, being connected between each phase of the line and a primary of the transformer, for controlling and timing the transfer of power.

The ignitrons are fired by grid-controlled firing valves, specifically thyratrons, in conventional fashion, the firing valves being supplied continuously with appropriate control voltage from the three phase line, over a phase shifter, which serves to determine the times of firing of the firing valves, and consequently of the discharge valves, with respect to the phases of the voltages supplied to the discharge valves by the line.

The discharge valves and their associated firing valves may be grouped, each group containing one discharge valve of each of the back to back pairs, and the valves of each group operating to transfer current in the same direction into the welding load. Accordingly, the discharge valves of one group fire in succession, at 120° phase intervals, until the operation of the group is discontinued by a control signal, the discharge valves of the remaining group firing in succession after completion of the firing of the valves comprising the first group, until the operation of the remaining group is in its turn discontinued.

The firing valves of each group are supplied with blocking potential, which may be applied to the firing valves of each group selectively, or to the firing valves of both groups simultaneously.

Additionally, each discharge valve is provided with an auxiliary anode, which together with the cathode of the valve provides effectively a switch, which is open when the discharge valve is not fired, and which is closed effectively by the arc discharge in the valve when the latter is firing. The auxiliary anode circuits of the various discharge valves are utilized to control a special interlock circuit, constituting one important feature of the present invention, and which is arranged as follows.

A special transformer is associated with each group of discharge valves, each transformer being provided with two separate cores which have no magnetic flux interlinkage. The auxiliary anode to cathode circuit of each discharge valve of a group is connected each across a separate auxiliary winding which links with both cores simultaneously, and two further windings are provided, one of which, called the primary winding, links one of the cores only, and the other of which, called the secondary winding, links the other of the cores only. Normally then, while the associated discharge valves are not firing, transfer of energy between the primary and the secondary windings does not take place, these windings having no mutual inductance since they are wound on mutually isolated cores. When, however, any one of the associated discharge valves is firing a circuit is closed for the associated auxiliary windings, which links both cores, and transfer of energy from the primary to the secondary winding takes place via the auxiliary winding.

The primary windings of the special transformers associated respectively with the discharge valve groups are energized at all times. The secondary winding of the transformer associated with the first group of valves is connected to energize a circuit which develops hold-off bias for all the firing valves of the second group of discharge valves, and the secondary winding of the transformer associated with the second group of valves is connected to energize a circuit which develops hold-off bias for all the firing valves of the first group of discharge valves.

Accordingly, whenever any discharge valve of the first group is firing, no valve of the second group is enabled to fire, and alternately, when any discharge valve of the second group is firing no valve of the first group is able to fire. The system of the present invention accordingly provides positively for the alternate firing of the separate groups of valves, and for completion of a then occurring cycle of firing of a discharge device of one group before any valve of the alternate group may commence firing.

Sequencing circuits are provided for controlling squeeze-time, weld-time, hold-time and off-time, and a further special circuit is provided, which, in conjunction with the circuit for establishing weld time intervals, establishes sub-intervals of the weld-time, and controls the arc discharge devices to provide welding current in opposite directions during alternate sub-intervals.

Total weld time is established in terms of the charge on a weld time condenser connected in the grid circuit of a gaseous control tube to provide hold-off bias therefor, and an auxiliary discharge circuit is provided including an auxiliary condenser of smaller capacity than the weld time condenser, which abstracts from the weld time condenser successive increments of charge, until the latter is completely discharged and the associated gaseous control tube fires, terminating the weld time. Successive increments of charge are removed from the weld time condenser by means of a frequency control arrangement, comprising a gaseous control tube having a hold-off timing circuit, the latter comprising a timing condenser and separate charge and discharge timing circuits therefor, which are separately adjustable. The time constants of the charge and discharge circuits are adjusted normally to provide equal on and off times for the frequency control tube, by manually adjusting each of a pair of control potentiometers, one in the charge and the other in the discharge circuit of the timing condenser. A relay is provided in the plate circuit of the control tube, which, when energized, completes the charging circuit for the timing condenser, and which when deenergized completes the discharge circuit therefor.

Accordingly, the frequency control tube is turned off and on in accordance with its own law of operation, at controllable intervals.

Each energization of the frequency control relay additionally completes the circuit which abstracts an increment of charge from the weld time control condenser, so that, after a predetermined number of cycles of low frequency operation of the frequency control relay, the weld time condenser completes its discharge, firing the weld time control tube, and initiating a hold operation in the operating sequence.

Contacts are provided, which are closed and opened in alternation by the frequency control relay, and which serve alternately to apply energy to the off-bias control or hold circuits of the firing valves associated with the separate groups of arc discharge welding power control tubes, or ignitrons, of the system, applying hold off signal to one bias control circuit, while the frequency control relay is energized, and to the other while the frequency control relay is deenergized. In this manner low frequency alternating current, or successive pulses of alternately reversing direct current, are applied to the welding load, substantial in synchronism with the operations of the frequency control relay.

After a predetermined number of complete cycles of low frequency welding current have passed through the welding load, and the weld time control tube fires, contacts are closed which complete simultaneously circuits for both off-biasing or hold circuits which control the ignitron firing tubes, preventing further operation of both groups of ignitrons and terminating the welding interval or weld time.

The novel features which I consider to be characteristic of my invention are set forth with particularity in the appended claims. The invention itself, however, both as to its organization and its method of operation, together with additional objects and advantages thereof, will best be understood from the following description of a specific embodiment thereof, especially when read in connection with the accompanying drawings, wherein:

Figures 1A and 1B, taken together, provide a diagrammatic circuit diagram of an embodiment of the invention, and Figure 2 is a diagrammatic representation of a special circuit control transformer utilized in the invention of Figures 1A and 1B.

Referring now to Figure 1A of the drawings, the reference numerals L1, L2 and L3 identify the lines of a three phase power source, the separate phases of which supply power to ignitrons ITU and 4TU, 2TU and 5TU, 3TU and 6TU, arranged in back to back pairs, one pair across each phase of the source, to separate primary windings 11, 12, 13 of a transformer T the single secondary winding 14 of which supplies power to a welding load L.

Each of the ignitrons ITU . . . 6TU, inclusive, is controlled by a thyratron, the respective thyratrons being identified by the designations 1CT . . . 6CT, and being connected each in series between the anodes and the igniting rod of an associated ignitron, so that firing of any thyratron initiates firing of the associated ignitron.

Firing voltage is supplied to the control grids of the thyratrons 1CT . . . 6CT over transformers 1T . . . 6T, respectively, the various transformers being connected via a variable phase shifter PS to the lines L1, L2 and L3. The variable phase shifter PS serves to vary the phase of the voltages applied to the control grids of the respective thyratrons 1CT . . . 6CT, with respect to the voltages applied to the anodes thereof directly from the lines L1, L2, L3, whereby to vary the firing times of the thyratrons 1CT . . . 6CT, and of the ignitrons 1TU . . . 6TU, and thereby the average power supplied to the welding load L.

It will be realized that the utilization of ignitrons and thyratrons in the present invention involves a matter of choice of circuit elements, and that other types of electronic discharge devices may be employed in practicing the invention, without departing from the true spirit thereof. Accordingly, the valves 1CT . . . 6CT will be referred to hereinafter as firing valves, for the sake of generality, since these valves serve to initiate firing of the ignitrons. The ignitrons themselves may be referred to as arc discharge devices or valves, it being their function to pass current to the welding load. In particular, it will be evident that thyratrons may be substituted for the ignitrons 1TU ... 6TU, for operating into relatively light welding loads, and that hard or purely electronic valves may be utilized in place of the thyratrons 1CT ... 6CT, if the required firing current is of sufficiently low value.

An additional control is provided in the control grid circuit of each of the thyratrons 1CT ... 6CT, comprising in each case a bias circuit including a parallel combination of resistance R1 and condenser C1, across which is connected a rectifier unit RX, the separate rectox units RX being supplied with power by transformers 7T ... 12T inclusive, associated respectively with the thyratrons 1CT ... 6CT. Upon energization of any one of the transformers 7T ... 12T, the rectox unit connected across the secondary of the transformer develops a cut-off bias voltage for the associated thyratron 1CT ... 6CT, preventing firing thereof in response to firing voltage developed by the firing transformers 1T ... 6T, respectively.

In the system of the present invention the set of ignitrons 1TU, 2TU and 3TU are to be fired in sequence for a period, after which the set of ignitrons 4TU, 5TU and 6TU are to be fired in sequence for an equal period. In accordance with the invention an interlock is provided which operates in response to firing of any one of either group of ignitrons to prevent firing of the ignitrons of the alternate group. For this purpose I provide within the envelope of each of the ignitrons 1TU ... 6TU an auxiliary anode 15 from which current may be derived, when and only when, the ignitron of which it forms part is firing. Separate control windings 16, 17 and 18 of a transformer 13T are connected across the auxiliary anode to cathode circuits of the ignitrons 1TU, 2TU and 3TU respectively; and separate control windings 19, 20, 21 of a further transformer 14T are connected across the auxiliary anode to cathode circuits of the ignitrons 4TU, 5TU and 6TU, respectively. A. C. power is supplied to transformers 13T and 14T over primary windings 22 and 23 respectively, which are connected in parallel across terminals 24, 25, which are coupled permanently to one phase of the three phase supply, as will be disclosed in greater detail hereinafter. A secondary 26 associated with transformer 14T supplies power to transformers 7T, 8T, and 9T in parallel, over leads 27 and 28. Transfer of power between primary 23 and secondary 26 of transformer 14T occurs, however, only in the presence of current in one of control windings 19, 20, 21 for reasons provided hereinafter.

Alternatively, when any one of ignitrons 1TU, 2TU, and 3TU conduct, the auxiliary anodes 15 thereof apply power to an associated control winding 16, 17 or 18 of transformer 13T enabling the transfer of energy between primary 22 and secondary 29 of transformer 13T, and the consequent transfer of energy to transformers 10T, 11T and 12T, associated with thyratrons 4CT, 5CT and 6CT, respectively, for developing cut-off bias for thyratrons 4CT, 5CT and 6CT and consequently preventing firing of ignitrons 4TU, 5TU and 6TU.

Control of energy transfer between primary 23 and secondary 26 of transformer 14T depends upon the following factors. Windings 23, 19, 20 and 21 are wound on a common core 30 so that electromagnetic coupling exists between these windings. Winding 26 is wound on an independent and separate core 31, which interlinks also with windings 19, 20 and 21. Accordingly, if all of windings 19, 20 and 21 are open circuited, no electromagnetic coupling exists between windings 23 and 26, by reason of the fact that they are wound on independent cores having no mutual flux linkages. On the other hand, completion of the circuits of any of windings 19, 20, 21 results in the creation of a flux linkage path, as between the cores 30 and 31, via one of the common windings 19, 20, 21 and consequently as between primary winding 23 and secondary winding 26.

The circuits of one of windings 19, 20 and 21 are completed, however, only when one of ignitrons 4TU, 5TU, 6TU, is conductive, and accordingly firing of any of ignitrons 4TU, 5TU, 6TU is accompanied by development of off-biasing potential at all the thyratrons 1CT, 2CT and 3CT.

Conversely, and by virtue of similar reasoning, firing of any of ignitrons 1TU ... 3TU is accompanied by development of off-biasing potential at thyratrons 4CT, 5CT, and 6CT, which disables the ignitrons 4TU, 5TU, 6TU.

Accordingly, a positively acting interlock is provided, comprising transformers 13T and 14T, which prevents firing of any of the ignitrons 1TU, 2TU and 3TU while any of ignitrons 4TU, 5TU and 6TU are firing, and vice versa.

Referring now specifically to Figure 2 of the drawings, there is provided a simplified schematic diagram of the transformer 14T of Figure 1A of the drawings, showing the separate cores 30 and 31, and the control windings 19, 20 and 21, each linking with both of cores 30 and 31, and providing a gate for transfer of energy from primary 23 to secondary 26, when and only when the circuit of one of the control windings 19, 20, 21 is completed. The transformer 13T is, of course, identical with the transformer 14T, and accordingly requires no exposition per se.

Referring now to Figure 1B of the drawings, the primary winding 32 of a transformer 15T, connected across one phase of the three phase line L1, L2, L3, supplies control potential for the system over a pair of secondary windings 33 and 34. One of the secondaries, 33, supplies A. C. voltage directly across the lines 24, 25 for energizing the primaries 22 and 23 of transformers 13T and 14T whenever power is available in the three phase line L1, L2, L3. Additionally, while secondary 33 is energized power is supplied to a relay TD which pulls up on the first application of power thereto, closing normally open contacts TD1 after a time delay introduced by the dashpot D, applying potential to the line 35, which however remains open at contacts 36.

The secondary winding 34 of transformer 15T supplies potential to various sequence control circuits and thyratron control tubes, which control the sequencing of the present system. One portion 37 of the center tapped secondary winding 34 is connected in a series circuit containing a dropping resistor R2, a variable potentiometer 1P, a further dropping resistor R3, and back to tap 38 of secondary 34. The variable arm 39 of the potentiometer 1P is connected over a pair of series connected resistors R4 and R5 and over normally closed contacts 40 and a further dropping resistor R6, to a further terminal 41 of secondary winding 34. The point of interconnection of resistors R4 and R5 is connected via a timing circuit consisting of a parallel combination of resistor R7 and condenser C7 to the control grid 42 of a gaseous control tube or thyratron 7CT, the cathode 43 of which is connected directly to the center tap 38 of the secondary 34 of transformer 15T. The condenser C7 is charged by grid conduction, maintaining the grid 42 negative and the thyratron 7CT in a non-conductive condition, the total charge on the condenser being a function of the setting of the potentiometer 1P, since this determines the charging potential of the condenser C7.

Upon closure of the manually or foot controlled starting switch FS a circuit is completed for the relay 5CR via the line 44, the normally closed contacts 45 of relay 10TD and back to the center tap 38 of secondary 34 via lines 46 and 47. Relay 5CR pulls up establishing an obvious holding circuit for itself over contacts 48 and establishes anode circuits over now closed contacts 49 and line 50, for the thyratron 7CT, via relay 7TD, for the thyratron 8CT via relay 8TD, and for the thyratron 9CT via relay 9TD. Simultaneously, the contacts 40 open, removing charging potential from condenser C7 and enabling the condenser C7 to discharge through resistor R7 and the potential of the grid 42 to rise, accordingly, after a predetermined time, to a value suitable for enabling the thyratron tube 7CT to fire.

The discharge time of the condenser C7 constitutes the "squeeze time" of the system, the total "squeeze time" interval being established by the setting of the potentiometer 1P, and being terminated upon firing of thyratron 7CT and the accompanying relay operation.

Firing of the thyratron 7CT effects energization of the relay 7TD, which pulls up and completes a circuit for the relay 6CR over the contacts 51. Relays 7TD and 6CR now remain energized for the remainder of the sequencing operation. Energization of relay 6CR opens normally closed contacts 52 which are in circuit with the grid circuit of the thyratron 8CT, opening the latter circuit.

Simultaneously the normally open contacts 36 of relay 7TD close, completing an energizing circuit for relay 1CR, which pulls up, opening normally closed contacts 54 and 55, and thereby removing power from line pairs 24, 56 and 25, 57 which supply off-biasing signal to transformers 7T, 8T, 9T and 10T, 11T, 12T respectively, and to associated rectifier units RX, to maintain the ignitrons 1TU ... 6TU all in unfired condition, for all times prior to the firing of thyratron 7CT, and the consequent energization of relay coil 7TD and the closure of contacts 36.

Simultaneously, the normally open contacts 58 associated with relay 6CR close, establishing a circuit for the cathode of the thyratron 9CT. Thyratron 9CT immediately fires, energizing relay 9TD, which pulls up, closing normally open contacts 59 and completing a circuit from secondary 33 over lines 24 and 56, from which branch lines 60 and 61 lead to the primaries of transformers 7T, 8T and 9T. These transformers supply current to charge the grid circuits of the thyratrons 1CT, 2CT and 3CT blocking the latter and preventing firing of the ignitrons 1TU, 2TU and 3TU. Meanwhile, ignitrons 4TU, 5TU and 6TU conduct since no blocking bias is applied to the associated firing tubes 4CT, 5CT and 6CT, the contacts 62 being now open and consequently the lines 57, which complete a circuit for energizing off-bias generating transformers 10T, 11T and 12T, being incomplete or open.

*Total weld time*

Connected between line L-4 and line 46, and consequently across section 37 of secondary 34 of transformer 15T, is provided a potentiometer circuit comprising in series a potentiometer 8P, and a dropping resistor 8R1. There is accordingly established at the variable arm 63 of the potentiometer 8P a potential determined by the setting of the variable arm 63. The variable arm 63 of the potentiometer 8P is further connected over a pair of resistors 8R2 in series, to the normally closed contacts 52 and thence over normally closed contacts 64 associated with relay 8TD and via line 60 to the terminal 41 of secondary 34. The voltage present at the junction of resistors 8R2 is applied to charge the weld time condenser 8C1 by grid conduction in thyratron 8CT, the charge on condenser 8C1 being of such polarity as to maintain the grid of thyratron 8CT negative, and the thyratron itself in unfired condition. The condenser 8C1 is of considerable capacity, and acts as a charge reservoir transferring increments of its charge to a smaller capacitor 8C2 over a resistor 8R3 in response to closure of normally open contacts 65 of relay 9TD, and the condenser 8C2 itself discharging over resistor 8R3 and via normally closed contacts 66 when relay 9TD is deenergized. Resistor 8R3 and capacitor 8C2 are small so that each partial discharge of 8C1 takes place in a short time interval (substantially instantaneously).

At the time of commencement of a total weld time, i. e., when relays 7TD and 6CR energize, the tube 8CT is biased off, and the condenser 8C1 is charged to a voltage determined by the setting of potentiometer arm 63 of potentiometer 8P. The total weld time terminates upon discharge of condenser 8C1 to the extent required to enable firing of thyratron 8CT, and this time is determined by the relative capacities of condensers 8C1 and 8C2 and by the total original potential of condenser 8C1. Discharge of condenser 8C1 occurs in successive cycles, at relatively low frequency, these cycles being established by on-off operation of frequency control relay 9TD and consequent closing and opening of contacts 65, and accompanying opening and closing of contacts 66. Each time that contacts 65 close a portion of the charge existing on condenser 8C1 leaks off to condenser 8C2 which is of relatively small capacity, and each time that contacts 66 close the condenser 8C2 is discharged over its associated resistor 8R3, in preparation for a further charging cycle.

After a predetermined number of such operations, which occur at a frequency determined by timing circuits established in the grid circuits of thyratron 9CT, the condenser 8C1 becomes fully discharged, and the thyratron 8CT fires, completing a total welding time. During alternate on-off operations of the relay 9TD, alternate sets of ignitrons 1TU, 2TU, 3TU and 4TU, 5TU, 6TU are caused to provide current to the weld, in opposite directions, as will appear as the description proceeds.

The duration of the welding periods and their frequency are determined by operation of the relay 9TD, the thyratron 9CT and an on-and-off timing circuit including a condenser 9C connected in the grid circuit of the thyratron 9CT.

Charging current for the timing condenser 9C, in the grid circuit of the thyratron 9CT is provided by the secondary winding 69 of a transformer 16T, over normally open contacts 67 of relay 9TD, charging taking place, while thyratron 9CT is fired, over potentiometer 9P1 and by grid conduction in thyratron 9CT. The total charging time of condenser 9C is determined, accordingly, by the setting of potentiometer 9P1. After condenser 9C has charged for a sufficiently long time interval the grid of thyratron 9CT becomes negatively biased, beyond its critical value, and on a succeeding negative half cycle of potential applied to the thyratron 9CT firing thereof ceases. The relay 9TD then releases, opening contacts 67 and closing contacts 68. Condenser 9C now discharges through potentiometer 9P2 over now closed contacts 68, until the potential in the grid of thyratron 9CT has risen to a value sufficient to enable re-firing thereof. Normally the settings of potentiometers 9P1 and 9P2 may be adjusted to provide equal charge and discharge times for the condenser 9C, so that the half cycles of welding time established by the relay 9TD will be equal. The time values of half periods, and accordingly the frequency of the welding cycles, may be adjusted by the joint settings of potentiometers 9P1 and 9P2.

These potentiometers are so set that relay 9TD remains in its "on" and "off" positions for intervals determined by the welding frequency desired. During these "on" and "off" intervals each group of ignitrons 1TU, 2TU and 3TU and 4TU, 5TU and 6TU, respectively, is conductive in its turn. The "on" and "off" intervals are so set that all three tubes of each group conduct an equal number of times. At the end of the total weld interval relay 9TD drops out—that completes an "on" interval. Condenser 8C1 then discharges into condenser 8C2 and tube 8CT becomes conductive. Since condenser 8C1 discharges substantially instantaneously, tube 8CT becomes conductive immediately following the dropping out of relay 9TD and the current flow through the ignitrons is immediately discontinued. The time which elapses between the last dropping out of relay 9TD and the opening of the firing circuits for the ignitrons is so short that the firing circuits for the ignitrons of the non-conductive group have opened before the last ignitron of the conductive group becomes non-conductive.

While the contacts 68 alternately open and close, and the contacts 67 simultaneously close and open, establishing the sub-intervals of the welding period, the contacts 65 and 66 operate to remove successive increments of charge from total weld time capacitor 8C1 and the contacts 59 and 62 close in alternation to effect firing of the ignitron groups 1TU, 2TU, 3TU and 4TU, 5TU, and 6TU in alternation by completing circuits from secondary 38 of transformer 15T to lines 56 and 57 in alternation.

After completion of discharge of total weld time capacitor 8C1, the thyratron 8CT fires, pulling up the relay 8TD. Contacts 70 now open breaking the holding circuit 71 for the relay 1CR. The latter releases, closing contacts 54 and 55 and establishing a lock-out bias simultaneously for all the thyratrons 1CT . . . 6CT over lines 56 and 57, and terminating the transfer of power to the welding load over that one of ignitrons 1TO . . . 6TU which last fired, and preventing refiring of any of the ignitrons thereafter.

Additionally, the contacts 72 of relay 8DT open, initiating a hold period by initiating discharge of a timing circuit in the grid circuit of thyratron 10CT, and the contacts 64 of relay 8TD open, breaking the charging circuit for condenser 8C1, and thus maintaining the tube 8CT in fired condition.

The condenser 10C in the grid circuit of thyratron 10CT is normally charged over a potentiometer 10P which establishes a charging potential for the condenser 10C. The normal condition of the thyratron 10CT is "off," so long as the relay contacts 72 of 8TD remain closed. Upon opening of relay contacts 72, at the termination of a weld period, the charging circuit is interrupted and the condenser 10C discharges over resistor 10R. After an interval determined by the time constant of the circuit comprising 10C and 10R, and by the setting of the potentiometer 10P, the grid of thyratron 10CT attains firing potential and the thyratron 10CT fires, energizing relay 10TD.

Energization of relay 10TD opens contacts 45, opening the line 44 and causing deenergization of relay 5CR. The contacts 49 then reopen, breaking the line 50 and removing potential from the plates of thyratron control tubes 7CT, 8TD, 9TD. Plate potential for control tube 10TD is maintained, however, by a circuit extending over normally closed contacts 75 and blade 77 of a two position switch 78, line 83, and back to secondary 34 of transformer 15T.

Simultaneously, contacts 80 of relay 10TD open, removing charging potential from timing circuit 11C, 11R in the grid circuit of "off" thyratron 11CT, initiating an "off" timing interval. At the same time contacts 82 of relay 10TD open, opening the charging circuit for timing circuit 10C, 10R at a new point, to offset the closure of contacts 72, of relay 8TD which is deenergized due to loss of plate potential at the plate of thyratron 8CT.

After the "off" time interval has been completed the thyratron 11CT fires, pulling up relay 11TD and breaking the contacts 75, and thereby its own plate circuit and the plate circuit of hold tube 10CT, and both tubes become non-conductive.

The two position switch 78 performs the function of by-passing the circuit closer FS in providing a circuit over line 83 for the control thyratrons 10CT and 11CT and associated relays 10TD and 11TD when in the position illustrated, and supplying operating voltage to the hold circuit comprising thyratron 10CT and relay 10TD to the exclusion of off relay 11TD and thyratron 11CT when in the alternative position. When switch 78 assumes the position illustrated then, the system operates in repeated cycles, whereas the alternative position contemplates making of single welds, or non-repeat operation.

The latter operation requires no "off" time, and each welding operation requires separate closure of switch FS. Repeat operation requires the interposition of an "off" period between the "hold" and squeeze intervals.

It is to be understood that the present invention is not limited to the particular details as described above, since many equivalents for the specific elements and arrangements utilized in the above disclosure will suggest themselves to those skilled in the art. While the invention has been disclosed as applied to a welding system, it is susceptible broadly to use as a system of controlled transmission of power between a three phase power source and a single phase load and addtionally as a frequency changing system for translating the frequency of a source into a lower frequency having a value which may be selected at will. Various types of tubes may be substituted for the electronic discharge devices disclosed and modifications of the specific circuit arrangements disclosed may be devised which incorporate the principles of operation set forth in the specific embodiment of the invention herein disclosed.

In view of the above facts, it is desired that the appended claims be accorded a broad interpretation which is commensurate with the true spirit and scope of the invention within the pertinent art.

I claim as my invention:

1. In a system for transmitting power between a source and a load, a pair of electric discharge devices connected inversely in parallel between said source and said load, means for controlling the conduction of said discharge devices, and means for preventing simultaneous conduction of said discharge devices, including a transformer having two magnetically independent cores, a first winding on one of said cores connected to a power source, a second winding on the other of said cores connected in the bias circuit of one of said discharge devices, and a third winding common to said independent cores and connected to be energized by conduction of the other of said discharge devices.

2. In a system for transmitting power between a three-phase three-line power source, and a single phase load, a three-phase to single-phase transformer having three primary windings and a secondary winding, each of said primary windings being connected across a pair of lines of said three-phase three-line power source, a pair of discharge devices connected in inverse parallel relation in series with each of said primary windings, a group consisting of one of each pair of said discharge devices being connected to enable transfer of current of one polarity to said secondary winding in a first phase, means for controlling the conduction of each group of said discharge devices, and means to prevent any one of one group of said discharge devices from conducting while any one of the other group of said discharge devices is conducting, including a transformer having a primary winding connected to one phase of said power source, and a secondary winding connected in the bias circuits of one of said groups of discharge devices, a first magnetic core for said primary winding and a second magnetic core for said secondary winding, said cores being normally magnetically mutually isolated, a normally open-circuited auxiliary winding associated with each electric discharge device of a group, and linking both of said magnetic cores, and means for closing said normally open-circuited auxiliary winding responsive to conduction of the electric discharge device associated with that winding.

3. In a system for transmitting power between a three-phase three-line power source, and a single-phase load, a three-phase to single-phase transformer having three primary windings and a secondary winding, each of said primary windings being connected across a pair of lines of said three-phase three-line power source, a pair of discharge devices having a principal anode and an auxiliary anode, and a cathode connected in inverse parallel relation in series with each of said primary windings, a group consisting of one of each pair of said discharge devices being connected to enable transfer of current of one polarity to said secondary winding in a first phase, means for controlling the conduction of each group of said discharge devices, and mean to prevent any one of one group of said discharge devices from conducting while any one of the other group of said discharge devices is conducting, including a transformer having a primary winding connected to one phase of said power source, and a secondary winding connected in the bias circuits of one of said groups of discharge devices, a first magnetic core for said primary winding and a second magnetic core for said secondary winding, said cores being normally magnetically mutually isolated, a normally open-circuited auxiliary winding connected between the auxiliary anode and the cathode of each of said discharge devices, and linking both of said magnetic cores.

4. In a system for transmitting power from a source to a load, a plurality of electric discharge devices connected inversely in parallel between said source and said load, means for controlling conduction of said discharge devices, means to prevent simultaneous conduction of said discharge devices of opposite polarity, including a pair of transformers each having two magnetically mutually isolated cores, a winding on one of said cores connected to said source, a winding on the other of said cores connected in the bias circuits of said discharge devices of one polarity, and a plurality of windings linking both of said cores, each of said plurality being connected to be energized responsive to conduction of a discharge device of the other polarity.

5. In a system for transmitting power from a source to a load, a transformer having a primary winding connected with said source and a secondary winding connected with said load, a first magnetic core for said primary winding and a second magnetic core for said secondary winding, said cores being normally magnetically mutually isolated, a normally open-circuited auxiliary winding linking both said magnetic cores, and means for closing the circuit of said normally open-circuited auxiliary winding comprising an arc discharge device path for transmitting current between said source and said load, said arc discharge device path comprising a path between an auxiliary anode and a cathode of an arc discharge device having a further anode and having means for establishing an arc between said further anode and said cathode.

6. In a timing system for timing transfer of current from a three phase source to a single phase load, a first group of arc discharge devices each connected in current controlling relation between one phase of said three phase source and said single phase load, a further group of arc discharge devices each connected in current controlling relation between one phase of said three phase source and said load, each of said first group of arc discharge devices being connected in inverse parallel relation with an arc discharge device of said further group of arc discharge devices, arc discharge devices of one of said groups being all arranged to transfer identically directed current in said load, a first group of firing valves for said first group of arc discharge devices, a second group of firing valves for said second group of arc discharge devices, first means for developing hold-off bias for said first group of firing valves for preventing firing operation of all the arc discharge devices of said first group of arc discharge devices when said second group of discharge devices are conductive, second means for developing hold-off bias for said second group of firing valves for preventing firing operation of all the arc discharge devices of said second group of arc discharge devices when said first group of discharge devices are conductive, means for periodically actuating said first and second means in alternation for a predetermined number of alternations, and means thereafter operative for actuating said first and second means simultaneously, said means for periodically actuating said first and second means comprising a timing circuit having a first timing condenser, means responsive to a predetermined variation of charge in said first timing condenser for actuating said first means, and means responsive to a further variation of charge in said first timing condenser for actuating said second means.

7. In a timing system for timing transfer of current from a three phase source to a single phase load, a first group of arc discharge devices each connected in current controlling relation between one phase of said three phase source and said single phase load, a further group of arc discharge devices each connected in current controlling relation between one phase of said three phase source and said load, each of said first group of arc discharge devices being connected in inverse parallel relation with an arc discharge device of said further group of arc discharge devices, arc discharge devices of one of said groups being all arranged to transfer identically directed current in said load, a first group of firing valves for said first group of arc discharge devices, a second group of firing valves for said second group of arc discharge devices, first means for developing hold-off bias for said first group of firing valves for preventing firing operation of all the arc discharge devices of said first group of arc discharge devices when said second group of discharge devices are conductive, second means for developing hold-off bias for said second group of firing valves for preventing firing operation of all the arc discharge devices of said second group of arc discharge devices when said first group of discharge devices are conductive, means for periodically actuating said first and second means in alternation for a predetermined number of alternations, means thereafter operative for actuating said first and second means simultaneously, said means for periodically actuating said first and second means comprising a timing circuit having a first timing condenser, means responsive to a predetermined variation of charge in said first timing condenser for actuating said first means, and means responsive to a further variation of charge in said first timing condenser for actuating said second means, and wherein is further provided a second timing condenser having a predetermined charge, means for varying said charge in the same sense in successive discrete quantities of charge, and means responsive to a predetermined total variation of said predetermined charge for actuating said first and second means simultaneously and for disabling said timing circuit.

8. In a timing system for timing transfer of current from a three phase source to a single phase load, a first group of arc discharge devices each connected in current controlling relation between one phase of said three phase source and said single phase load, a further group of arc discharge devices each connected in current controlling relation between one phase of said three phase source and said load, each of said first group of arc discharge devices being connected in inverse parallel relation with an arc discharge device of said further group of arc discharge devices, arc discharge devices of one of said groups being all arranged to transfer identically directed current in said load, a first group of firing valves for said first group of arc discharge devices, a second group of firing valves for said second group of arc discharge devices, first means for developing hold-off bias for said first group of firing valves for preventing firing operation of all the arc discharge devices of said first group of arc discharge devices when said second group of discharge devices are conductive, second means for developing hold-off bias for said second group of firing valves for preventing firing operation of all the arc discharge devices of said second group of arc discharge devices when said first group of discharge devices are conductive, means for periodically actuating said first and second means in alternation for a predetermined number of alternations, means thereafter operative for actuating said first and second means simultaneously, said means for periodically actuating said first and second means comprising a timing circuit having a first timing condenser, means responsive to a predetermined variation of charge in said first timing condenser for actuating said first means, and means responsive to a further variation of charge in said first timing condenser for actuating said second means, and wherein is further provided a second timing condenser having a predetermined charge, means for varying said charge in the same sense by successive discrete quantities of charge, and means responsive to a predetermined total variation of said predetermined charge for actuating said first and second means simultaneously and for disabling said timing circuit and wherein is still further provided means responsive to transfer of current by any arc discharge device of one of said groups of arc discharge devices for actuating that means for developing hold-off bias which controls the alternative group of arc discharge devices.

9. In a timing system for timing transfer of current from a three phase source to a single phase load, a first group of arc discharge devices each connected in current controlling relation between one phase of said three phase source and said single phase load, a further group of arc discharge devices each connected in current controlling relation between one phase of said three phase source and said load, each of said first group of arc discharge devices being connected in inverse parallel relation with an arc discharge device of said further group of arc discharge devices, arc discharge devices of one of said groups being all arranged to transfer identically directed current in said load, a first group of firing valves for said first group of arc discharge devices, a second group of firing valves for said second group of arc discharge devices, first means for developing hold-off bias for said first group of firing valves for preventing firing operation of all the arc discharge devices of said first group of arc discharge devices when said second group of discharge devices are conductive, second means for developing hold-off bias for said second group of firing valves for preventing firing operation of all the arc discharge devices of said second group of arc discharge devices when said first group of discharge devices are conductive, means for periodically actuating said first and second means in alternation for a predetermined number of alternations, means thereafter operative for actuating said first and second means simultaneously and means responsive to firing condition of an arc discharge device of one of said groups of arc discharge devices for actuating that one of said first and second means which prevents firing of the remaining group of arc discharge devices.

JOHN R. PARSONS.

References Cited in the file of this patent

UNITED STATES PATENTS

| Number | Name | Date |
|---|---|---|
| 1,830,232 | Kouyoumjian | Nov. 3, 1931 |
| 2,295,601 | Overbeck | Sept. 15, 1942 |
| 2,307,447 | Braaten | Jan. 5, 1943 |
| 2,356,859 | Leathers et al. | Aug. 29, 1944 |
| 2,385,214 | Livingston | Sept. 18, 1945 |
| 2,402,432 | Mumma | June 18, 1946 |
| 2,404,918 | Overbeck | July 30, 1946 |
| 2,431,083 | Sciaky | Nov. 18, 1947 |
| 2,464,287 | Beamer | Mar. 15, 1949 |
| 2,472,507 | Andresen | June 7, 1949 |